(12) United States Patent
Nakano et al.

(10) Patent No.: US 11,519,780 B2
(45) Date of Patent: Dec. 6, 2022

(54) MEASUREMENT SYSTEM, CORRECTION PROCESSING APPARATUS, CORRECTION PROCESSING METHOD, AND COMPUTER-READABLE RECORDING MEDIUM

(71) Applicant: NEC Corporation, Tokyo (JP)

(72) Inventors: Gaku Nakano, Tokyo (JP); Kazuhito Murata, Tokyo (JP); Masahiko Ohta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 275 days.

(21) Appl. No.: 16/763,073

(22) PCT Filed: Nov. 14, 2017

(86) PCT No.: PCT/JP2017/040945
§ 371 (c)(1),
(2) Date: May 11, 2020

(87) PCT Pub. No.: WO2019/097577
PCT Pub. Date: May 23, 2019

(65) Prior Publication Data
US 2020/0348168 A1 Nov. 5, 2020

(51) Int. Cl.
*G01H 1/00* (2006.01)
*G01H 17/00* (2006.01)
(Continued)

(52) U.S. Cl.
CPC ........... *G01H 17/00* (2013.01); *G06T 7/0002* (2013.01); *G06T 7/292* (2017.01); *G06T 7/97* (2017.01); *G06T 2207/30184* (2013.01)

(58) Field of Classification Search
CPC combination set(s) only.
See application file for complete search history.

(56) References Cited

U.S. PATENT DOCUMENTS 10,127,678 B2 * 11/2018 Pérez Acal ............ G06T 7/593
2005/0256395 A1 11/2005 Anabuki et al.
(Continued)

FOREIGN PATENT DOCUMENTS

JP    2003-156389 A    5/2003
JP    2005-283440 A    10/2005
(Continued)

OTHER PUBLICATIONS

Bell et al., "Instrumentation, Digital Image Correlation, and Modeling to Monitor Bridge Behavior and Condition Research Final Report", Jun. 2015, New Hampshire DOT Research (Year: 2015).*
(Continued)

*Primary Examiner* — Zhiyu Lu
(74) *Attorney, Agent, or Firm* — Sughrue Mion, PLLC

(57) ABSTRACT

The measurement system 100 includes: a measurement apparatus 20 that measures vibrations of an object 40; an imaging apparatus 30 that is located so as to capture an image of the measurement apparatus 20; and a correction processing apparatus 10. the correction processing apparatus 10 includes: a displacement calculation unit 11 that calculates a displacement of the measurement apparatus 20 based on time-series images of the measurement apparatus 20 output from the imaging apparatus 30; a movement amount calculation unit 12 that calculates an amount of movement of the measurement apparatus 20 relative to the imaging apparatus 30, based on the displacement; and a correction processing unit 13 that corrects vibrations of the object measured by the measurement apparatus 20, using the calculated amount of movement of the measurement apparatus 20.

9 Claims, 8 Drawing Sheets

(51) Int. Cl.
*G06T 7/292* (2017.01)
*G06T 7/00* (2017.01)

(56) References Cited

U.S. PATENT DOCUMENTS

| | | | |
|---|---|---|---|
| 2014/0168422 A1* | 6/2014 | Feng | G01S 17/86 |
| | | | 382/106 |
| 2016/0217587 A1* | 7/2016 | Hay | G06V 20/52 |
| 2017/0169575 A1 | 6/2017 | Pérez et al. | |
| 2017/0227906 A1* | 8/2017 | Kato | G03G 15/6529 |
| 2018/0052117 A1* | 2/2018 | Imai | G01M 5/0033 |
| 2018/0209883 A1* | 7/2018 | Imagawa | G01N 3/068 |
| 2021/0295540 A1* | 9/2021 | Sato | G06T 7/292 |

FOREIGN PATENT DOCUMENTS

| | | |
|---|---|---|
| JP | 2005-351883 A | 12/2005 |
| JP | 2015-175827 A | 10/2015 |
| WO | 2017/179535 A1 | 10/2017 |

OTHER PUBLICATIONS

Son et al., "Vibration Displacement Measurement Technology for Cylindrical Structures Using Camera Images", Mar. 2015, ScienceDirect (Year: 2015).*
International Search Report for PCT Application No. PCT/JP2017/040945, dated Jan. 23, 2018.
Yoneyama Satoru et al., "Bridge Deflection Measurement Using Digital Image Correlation with Camera Movement Correction", Material Transaction, 2012, vol. 53, No. 2, pp. 285-290, Japan.
English translation of Written opinion for PCT Application No. PCT/JP2017/040945, dated Jan. 23, 2018.

* cited by examiner

MEASUREMENT SYSTEM, CORRECTION PROCESSING APPARATUS, CORRECTION PROCESSING METHOD, AND COMPUTER-READABLE RECORDING MEDIUM

This application is a National Stage Entry of PCT/JP2017/040945 filed on Nov. 14, 2017, the contents of all of which are incorporated herein by reference, in their entirety.

TECHNICAL FIELD

The present invention relates to a measurement system, and a correction processing apparatus and a correction processing method used therefor. Furthermore, the present invention relates to a computer-readable recording medium on which a program for realizing them is recorded.

BACKGROUND ART

Conventionally, a technique has been proposed for contactlessly measuring mechanical vibrations of an object from a remote place without touching the object. Such a technique makes it unnecessary to attach or detach a sensor for detecting vibrations, and realizes efficient vibration measurement. Therefore, there is a need for such a technique especially in the field of maintenance and management, and abnormality detection, of infrastructural components such as bridges, roads, buildings, and facilities.

For example, Patent Document 1 discloses a vibration measurement apparatus that employs an imaging apparatus. The vibration measurement apparatus disclosed in Patent Document 1 measures vibrations of an object by acquiring time-series images of the object from the imaging apparatus, and performing image processing on the acquired time-series images. However, there is a problem in that the vibration measurement apparatus disclosed in Patent Document 1 can only measure vibration components in two-dimensional directions within the images, and cannot measure vibration components in the optical axis direction of the imaging apparatus.

Considering this problem, Patent Document 2 discloses a vibration measurement apparatus that employs, in addition to an imaging apparatus, a distance measurement apparatus such as a laser distance meter or an ultrasonic distance meter. The vibration measurement apparatus disclosed in Patent Document 2 can measure not only vibration components in two-dimensional directions within the images, but also vibration components in the optical axis direction of the imaging apparatus, using the distance measurement apparatus. Therefore, the vibration measurement apparatus can measure vibrations of the object in three-dimensional directions.

LIST OF RELATED ART DOCUMENTS

Patent Documents

Patent Document 1: Japanese Patent Laid-Open Publication No. 2003-156389
Patent Document 2: Japanese Patent Laid-Open Publication No. 2005-283440

SUMMARY OF INVENTION

Problems to be Solved by the Invention

When the object to be subjected to vibration measurement is an infrastructural component, the vibration measurement apparatus may be installed in a location that is likely to be vibrated due to the configuration of the infrastructural component, and may itself be vibrated. For example, if the object is a bridge, the vibration measurement apparatus may be installed on an inspection passage or a structural member of the bridge. In such a case, if the bridge is vibrated due to a vehicle or the like passing through it, the vibration measurement apparatus itself is also vibrated. If the vibration measurement apparatus itself is vibrated, it becomes difficult to accurately measure the vibration components of the object alone because the vibrations of the vibration measurement apparatus are superimposed on the vibrations of the object and observed.

An example object of the invention is to provide a measurement system, a correction processing apparatus, a correction processing method, and a computer-readable recording medium that can solve the above-described problems and with which vibrations of an object can be accurately measured even if the measurement apparatus that measures vibrations of the object is installed in a location that is likely to be vibrated.

Means for Solving the Problems

To achieve the above object, a measurement system according to one aspect of the invention is a measurement system including: a measurement apparatus that measures vibrations of an object; an imaging apparatus that is disposed so as to capture an image of the measurement apparatus; and a correction processing apparatus, the correction processing apparatus including:
a displacement calculation unit that calculates a displacement of the measurement apparatus from time-series images of the measurement apparatus output from the imaging apparatus;
a movement amount calculation unit that calculates an amount of movement of the measurement apparatus relative to the imaging apparatus, based on the displacement; and
a correction processing unit that corrects vibrations of the object measured by the measurement apparatus, using the calculated amount of movement of the measurement apparatus.

To achieve the above object, a correction processing apparatus according to one aspect of the invention is a correction processing apparatus for correcting vibrations measured by a measurement apparatus that measures vibrations of an object, the correction processing apparatus including:
a displacement calculation unit that calculates a displacement of the measurement apparatus from time-series images of the measurement apparatus output from an imaging apparatus that is located so as to capture an image of the measurement apparatus;
a movement amount calculation unit that calculates an amount of movement of the measurement apparatus relative to the imaging apparatus, based on the displacement; and
a correction processing unit that corrects vibrations of the object measured by the measurement apparatus, using the calculated amount of movement of the measurement apparatus.

Also, to achieve the above object, a correction processing method according to one aspect of the invention is a correction processing apparatus for correcting vibrations measured by a measurement apparatus that measures vibrations of an object, the correction processing apparatus including:
(a) a step of calculating a displacement of the measurement apparatus from time-series images of the measurement apparatus output from an imaging apparatus that is located so as to capture an image of the measurement apparatus;

(b) a step of calculating an amount of movement of the measurement apparatus relative to the imaging apparatus, based on the displacement; and (c) a step of correcting vibrations of the object measured by the measurement apparatus, using the calculated amount of movement of the measurement apparatus.

Furthermore, to achieve the above object, a computer-readable recording medium according to one aspect of the invention is a computer-readable recording medium having recorded thereon a program for correcting vibrations measured by a measurement apparatus that measures vibrations of an object, using a computer, the program including instructions that cause the computer to carry out:

(a) a step of calculating a displacement of the measurement apparatus from time-series images of the measurement apparatus output from an imaging apparatus that is located so as to capture an image of the measurement apparatus;

(b) a step of calculating an amount of movement of the measurement apparatus relative to the imaging apparatus, based on the displacement; and (c) a step of correcting vibrations of the object measured by the measurement apparatus, using the calculated amount of movement of the measurement apparatus.

Advantageous Effects of the Invention

As described above, according to the invention, it is possible to accurately measure vibrations of an object even if the measurement apparatus that measures vibrations of the object is installed in a location that is likely to be vibrated.

EXAMPLE EMBODIMENT

Example Embodiment

The following describes a measurement system, a correction processing apparatus, a correction processing method, and a program according to an example embodiment of the invention with reference to FIGS. 1 to 8.

Apparatus Configuration

Figure 1:
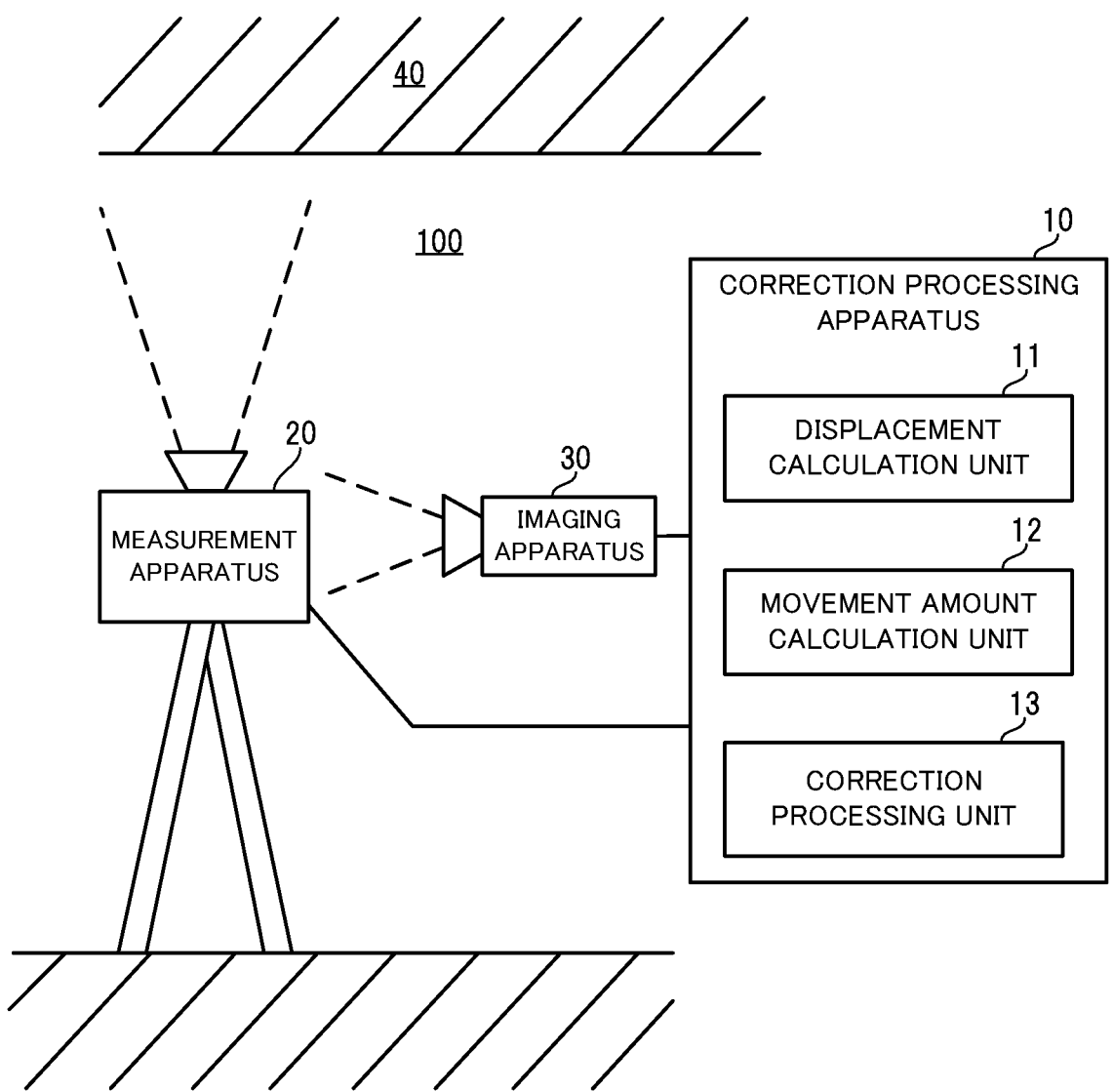
FIG. 1 is a configuration diagram showing overall configurations of a measurement system and a correction processing apparatus according to an example embodiment of the invention.

First, overall configurations of a measurement system and a correction processing apparatus according to the example embodiment will be described with reference to FIG. 1. FIG. 1 is a configuration diagram showing overall configurations of a measurement system and a correction processing apparatus according to the example embodiment of the invention.

A measurement system 100 according to the example embodiment shown in FIG. 1 is a system for measuring vibrations of an object 40. In the present example embodiment, the object 40 is, for example, an infrastructural component such as a bridge, a road, a building, or a facility.

As shown in FIG. 1, the measurement system 100 includes a measurement apparatus 20, an imaging apparatus 30, and a correction processing apparatus 10. Among these apparatuses, the measurement apparatus 20 is an apparatus that measures vibrations of the object 40. The imaging apparatus 30 is located so as to capture an image of the measurement apparatus 20.

The correction processing apparatus 10 includes a displacement calculation unit 11, a movement amount calculation unit 12, and a correction processing unit 13. The displacement calculation unit 11 calculates a displacement of the measurement apparatus 20 based on time-series images of the measurement apparatus 20 output from the imaging apparatus 30.

The moving amount calculation unit 12 calculates an amount of movement of the measurement apparatus 20 relative to the imaging apparatus 30 based on the calculated displacement of the measurement apparatus 20. The correction processing unit 13 corrects vibrations of the object 40 measured by the measurement apparatus 20, using the calculated amount of movement of the measurement apparatus 20.

In this way, in the present example embodiment, the amount of movement of the measurement apparatus 20 resulting from vibrations of the object 40, i.e. the vibration amount of the measurement apparatus 20 itself, is calculated. Then, through correction, the vibration amount of the measurement apparatus 20 itself is cancelled out from the vibrations measured by the measurement apparatus 20. Therefore, according to the present example embodiment, it is possible to accurately measure vibrations of the object 40 even if the measurement apparatus 20 that measures vibrations of the object 40 is installed in a location that is likely to be vibrated.

Figure 2:
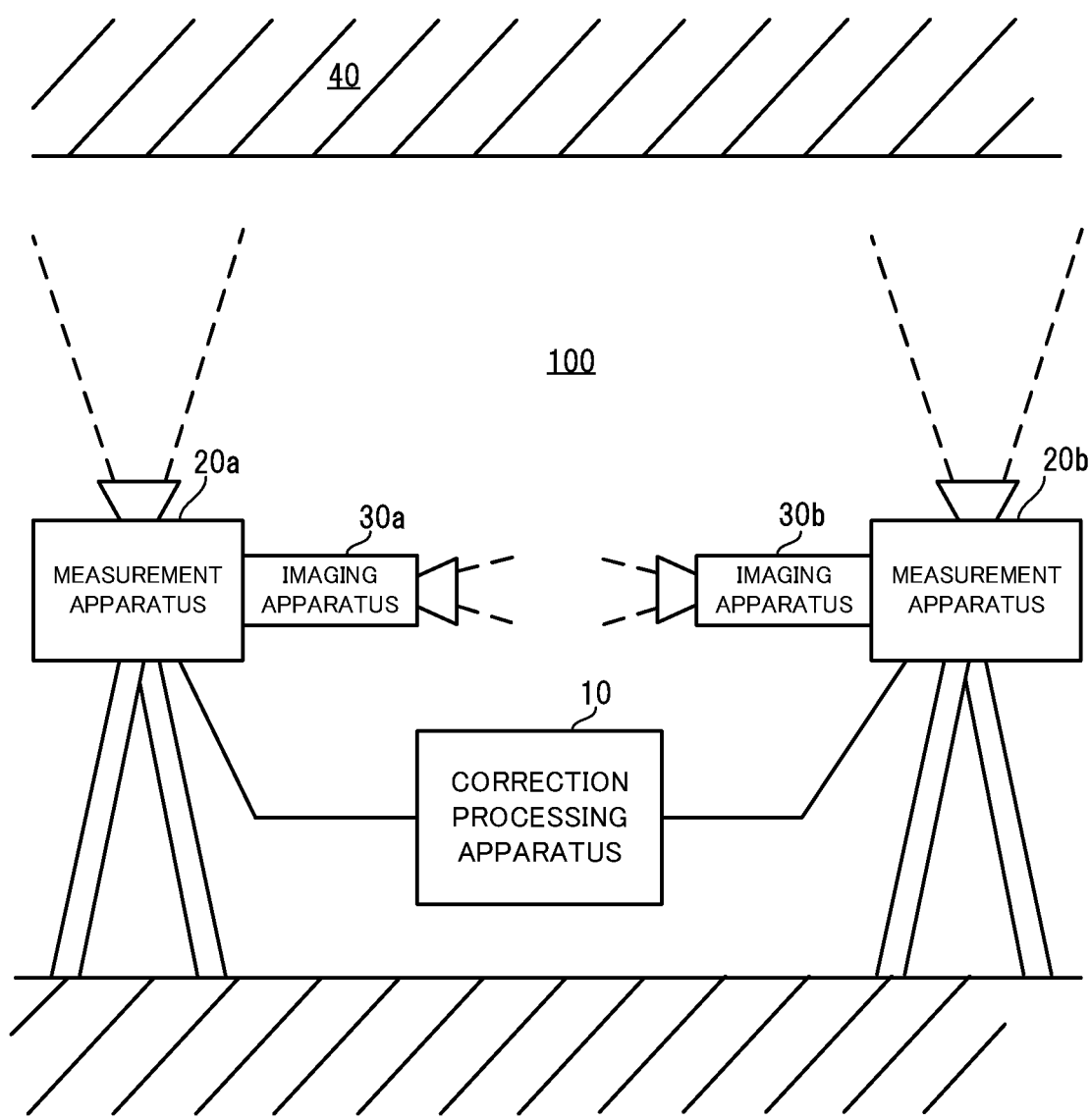
FIG. 2 is a configuration diagram more specifically showing an overall configuration of the measurement system according to the example embodiment of the invention.
Figure 3:
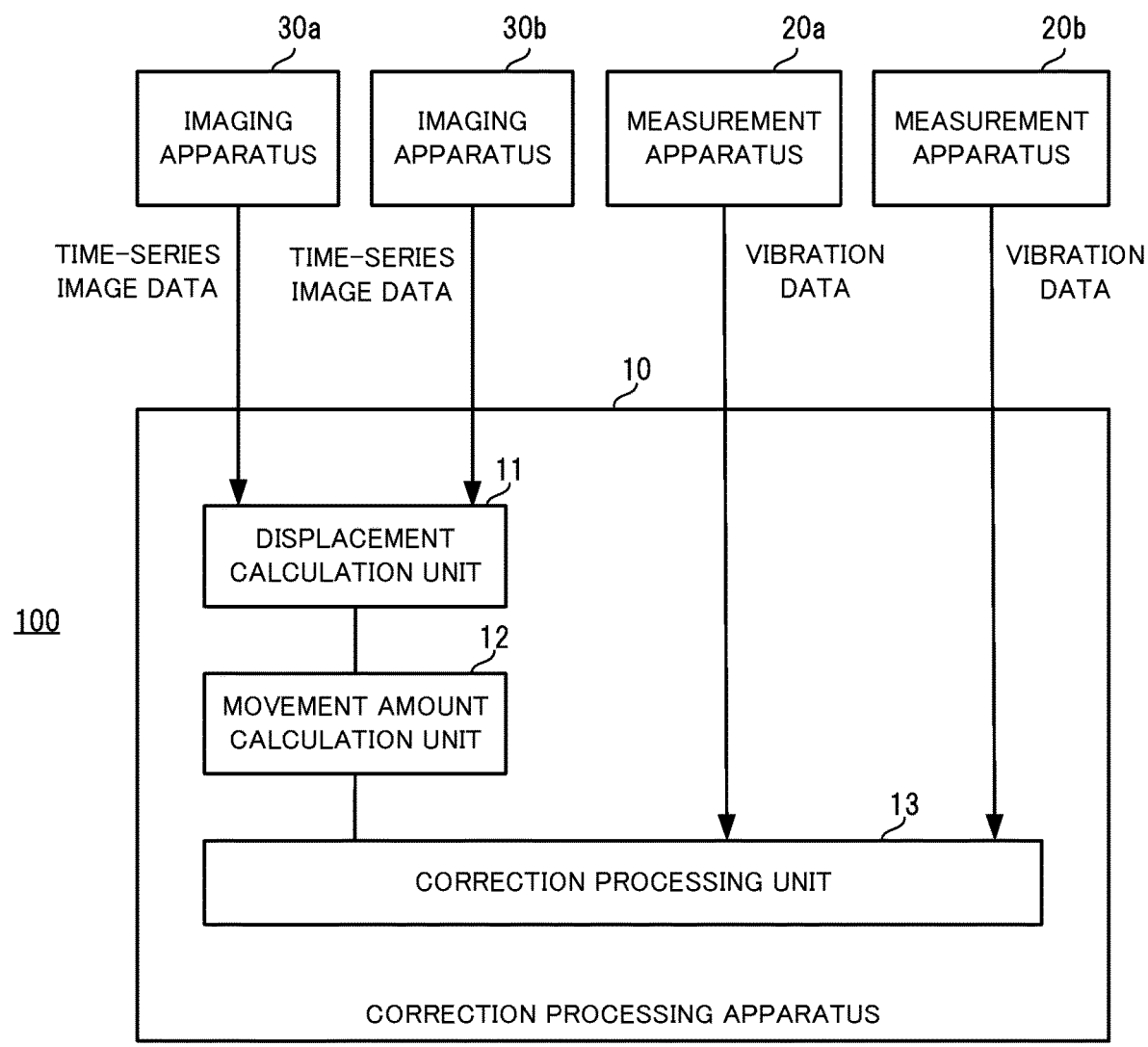
FIG. 3 is a block diagram more specifically showing the configuration of the correction processing apparatus according to the example embodiment of the invention.
Figure 4:
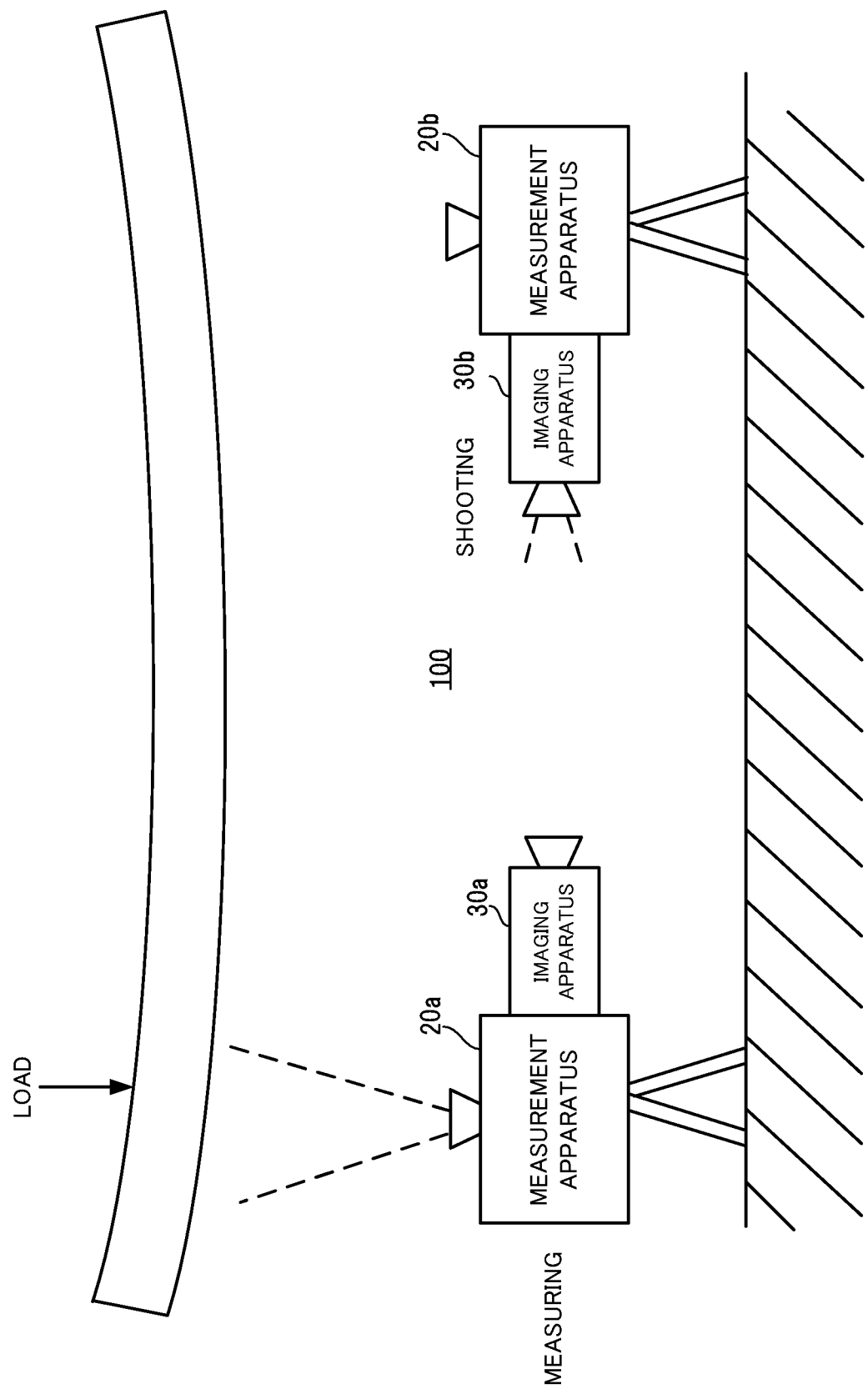
FIG. 4 illustrates a case where the measurement system according to the example embodiment of the invention is used to measure vibrations of a bridge.

Next, the configurations of the measurement system and the correction processing apparatus according to the example embodiment will be more specifically described with reference to FIGS. 2 to 4. FIG. 2 is a configuration diagram more specifically showing the overall configuration of the measurement system according to the example embodiment of the invention. FIG. 3 is a block diagram more specifically showing the configuration of the correction processing apparatus according to the example embodiment of the invention. FIG. 4 illustrates a case where the measurement system according to the example embodiment of the invention is used to measure vibrations of a bridge.

As shown in FIG. 2, in the example embodiment, the measurement system 100 includes a plurality of measurement apparatuses and a plurality of imaging apparatuses. In the example shown in FIG. 2, the measurement system 100 includes measurement apparatuses 20a and 20b and imaging apparatuses 30a and 30b. Note that, in the following description, the measurement apparatuses are simply referred to as "measurement apparatuses 20" when they are not distinguished from each other, and the imaging apparatuses are simply referred to as "imaging apparatuses 30" when they are not distinguished from each other.

Also, in the example embodiment, the object 40 is a bridge, and the measurement apparatuses 20a and 20b measure vibrations in a predetermined area (hereinafter denoted as a "measurement target area") of the lower surface of the superstructure of the bridge, such as the girder or the slab. Furthermore, the measurement apparatuses 20a and 20b are located at an interval so as to be able to measure vibrations in different parts of the object 40.

The directions of vibrations that are to be measured by the measurement apparatuses 20a and 20b are set to be three directions, namely two directions that are orthogonal to each other on the measurement target area, and a direction (a normal direction) that is orthogonal to the measurement target area.

Furthermore, in order to measure vibrations in three directions, each of the measurement apparatuses 20a and 20b includes an imaging apparatus (different from the imaging apparatus 30) that captures an image of the measurement target area, and a distance meter that measures the distance from the measurement apparatus to the measurement target area. Each of the measurement apparatuses 20a and 20b measures vibrations in two directions that are orthogonal to each other on the measurement target area from images output from the imaging apparatus thereof, and measures vibrations in the normal direction of the measurement target area from the distance measured by the distance meter.

Each of the measurement apparatuses 20a and 20b also inputs vibration data that specifies the measured vibrations in the three directions, to the correction processing apparatus 10. Note that, in the present example embodiment, the configurations of the measurement apparatuses 20a and 20b are not limited to the configurations shown in FIG. 2. The measurement apparatuses 20a and 20b may also only include an imaging device (different from the imaging apparatus 30). In such a case, each of the measurement apparatuses 20a and 20b specifies vibrations in the three directions based on images captured by the imaging device thereof.

Also, as shown in FIG. 2, in the present example embodiment, the imaging apparatus 30a corresponds to the measurement apparatus 20a, and is fixed to the measurement apparatus 20b corresponding thereto so as to be able to capture an image of the measurement apparatus 20a different therefrom. Similarly, the imaging apparatus 30b corresponds to the measurement apparatus 20b, and is fixed to the measurement apparatus 20a corresponding thereto so as to be able to capture an image of the measurement apparatus 20b different therefrom.

With such configurations, in the present example embodiment, as shown in FIG. 3, the displacement calculation unit 11 in the correction processing apparatus 10 calculates, for each imaging apparatus 30, a displacement of the measurement apparatus 20 captured by the imaging apparatus 30, based on time-series images of the measurement apparatus 20. Also, the moving amount calculation unit 12 calculates, for each measurement apparatus 20, the amount of movement of the measurement apparatus 20 relative to the imaging apparatus 30 that captures images thereof, based on the displacement calculated for the measurement apparatus 20. Furthermore, the correction processing unit 13 corrects, for each measurement apparatus 20, vibrations of the object 40 measured by the measurement apparatus 20, using the calculated amount of movement of the measurement apparatus 20.

Next, processing performed by the correction processing apparatus 10 will be specifically described below with reference to FIG. 3 described above. First, in the correction processing apparatus 10, the displacement calculation unit 11 acquires, for each imaging apparatus 30, time-series images output therefrom, and determines an image captured at a given point in time as a reference image, and determines the other images as processing images. Thereafter, the displacement calculation unit 11 calculates a displacement relative to at least one specific area (hereinafter denoted as a "specific area") of the reference image for each processing image.

Specifically, the displacement calculation unit 11 first compares the specific areas of each processing image with the specific areas of the reference image to specify the specific areas of each processing image that are the most similar to the specific areas of the reference image, and calculates displacements (d1x,d1y) of each specific area. A method for finding the most similar specific area is, for example, a method utilizing a similarity correlation function such as the SAD (Sum of Absolute Difference), the SSD (Sum of Squared Difference), the NCC (Normalized Cross-Correlation), the ZNCC (Zero-means Normalized Cross-Correlation) to find the position (the coordinate point) with the highest correlation level.

Also, in order to specify the position of the most similar specific area, the position (the coordinate point) of the specific area with the highest degree of correlation and a similarity correlation function regarding areas at front, rear, left, and right positions (the coordinate points) relative to the position (the coordinate point) may be utilized, and a method such as linear fitting, curve fitting, or parabolic fitting may be employed, using the calculated similarity correlation function. As a result, it is possible to more accurately calculate the position (the coordinate position) of an area with a high degree of similarity on the order of sub-pixels.

Next, in order to calculate a displacement d1z of the specific area in the normal direction, the displacement calculation unit 11 creates images (hereinafter denoted as a "set of reference images") by enlarging or reducing the reference image at predetermined magnifications. At this time, the displacement calculation unit 11 sets the central positions of the enlarged images or the reduced images created from the reference image, based on the previously calculated displacements (d1x,d1y), to create a set of reference images.

Next, the displacement calculation unit 11 calculates the degree of similarity between an area corresponding to the specific area of the processing image and the specific area of each of the images constituting the set of reference images. At this time, the degree of similarity can be calculated by, for example, using any of the similarity correlation functions described above, such as the SAD, the SSD, the NCC, and the ZNCC. Thereafter, the displacement calculation unit 11 specifies the image with the highest degree of similarity from among the images constituting the set of reference images, i.e. the image with the highest correlation level, and calculates the enlargement ratio or the reduction ratio (hereinafter denoted as a "magnification") of the specified image as an amount (d1z) that indicates the displacement of the specific area in the normal direction.

Also, after specifying the image with the highest degree of similarity, the displacement calculation unit 11 may select images before and after the specified image in order of magnifications, from among the set of reference images, calculate the similarity correlation function of the specified image and the selected image, and calculate a magnification as the amount (d1z) indicating the displacement in the normal direction, using the calculated similarity correlation function and employing a method such as linear fitting, curve fitting, or the like. As a result, it is possible to more accurately calculate the magnification (d1z) as an amount that indicates the displacement in the normal direction. Thus, the displacement calculation unit 11 calculates the displacements (d1x,d1y) and the magnification (d1z) as an amount that indicates the displacement in the normal direction for each processing image.

Also, in order to improve the accuracy of the displacement, the displacement calculation unit 11 may perform the above-described processing multiple times. Specifically, the displacement calculation unit 11 selects an image corresponding to the magnification d1z from among the images constituting the set of reference images, considering the influence of the previously calculated magnification d1z, and determines the selected image as a new reference image. Next, the displacement calculation unit 11 compares a processing image with a specific area of the new reference image to specify the area that is the most similar to the specific area of the new reference image from the processing image, calculates the position of the area, and detects displacements (d2x,d2y) of the specific area.

Next, the displacement calculation unit 11 sets the central position of enlargement or reduction for each of the images constituting the set of reference images, based on the newly detected displacements (d2x,d2y), to create a new set of reference images. Thereafter, the displacement calculation unit 11 calculates the degree of similarity between an area corresponding to the specific area of the processing image and the specific area of each of the images constituting the new set of reference images, and specifies the image with the highest degree of similarity from among the images constituting the new set of reference images. Thereafter, the displacement calculation unit 11 calculates the magnification of the specified image as an amount (d2z) that indicates the displacement of the specific area in the normal direction.

In this way, in the first processing, the displacements (d1x,d1y) are calculated without considering d1z, which is the magnification indicating the displacement in the normal direction, whereas, in the second processing, the displacements (d2x,d2y) are calculated considering the magnification d1z. Therefore, the calculation accuracy of the displacements (d2x,d2y) calculated through the second processing are improved. Also, if similar processing is performed multiple times, the accuracy of the displacement is further improved.

Although the processing in the above-described example is repeated twice, the number of repetitions is not particularly limited. The number of repetitions may be a preset number, or set as appropriate according to the result. Also, the processing may be repeated until the value of the calculated displacement reaches a threshold value.

In the following description, the displacements that are ultimately obtained for a given processing image are denoted as displacements (dnx,dny), and the amount indicating the displacement in the normal direction is denoted as a magnification (dnz). The results of similar calculation of the displacements for the time-series images can be regarded as values that change over time, and therefore they are denoted as displacements (dnx(t),dny(t)) and a magnification (dnz(t)).

The movement amount calculation unit 12 calculates the amount of movement of each measurement apparatus relative to the imaging apparatus based on the displacements (dnx(t),dny(t)) and the magnification (dnz(t)) of the measurement apparatus calculated by the displacement calculation unit 11 and imaging information regarding the imaging apparatus. Examples of imaging information regarding the imaging apparatus include the size of each pixel of the solid-state imaging device, the number of pixels, the focal distance of the lens, the distance from the principal point of the lens to the measurement apparatus, and the shooting frame rate.

Specifically, in the case of the example shown in FIG. 4, the moving amount calculation unit 12 calculates the amount of movement in the direction that is orthogonal to the measurement target area (the normal direction) and the amount of movement in the width direction of the bridge, of the vibration measurement apparatus, from the displacements (dnx(t),dny(t)). Also, the moving amount calculation unit 12 calculate the amount of movement in the longitudinal direction of the bridge, of the vibration measurement apparatus, from the magnification (dnz(t)). The moving amount calculation unit 12 calculates the amounts of movement for each of the frames constituting the time-series images. Therefore, each amount of movement can be regarded as vibration information obtained at sampling intervals that are equal to the inverse of the frame rate.

The correction processing unit 13 corrects the measured vibrations of each of the measurement apparatuses 20a and 20b, using the measure vibrations of the object 40 and the amount of movement calculated by the moving amount calculation unit 12.

Here, a specific application of the measurement system 100 according to the present example embodiment will be described with reference to FIG. 4. When the object 40 is a bridge as shown in FIG. 4, the measurement apparatuses 20a and 20b are located at an interval in the longitudinal direction of the object 40, which is a bridge, as shown in FIG. 4. Also, each of the measurement apparatuses 20a and 20b calculates vibrations of a different part of the lower surface of the slab of the bridge.

In this case, the correction processing unit 13 in the correction processing apparatus 10 can specify a position where the load of the bridge is applied, using sensors, switches, or the like that are attached to various positions all across the bridge, and specifies the measurement apparatus 20a that measures vibrations of a part that is the closest to the specified position.

Next, the correction processing unit 13 corrects the vibrations measured by the specified measurement apparatus 20a, using the time-series images output from the imaging apparatus 30b that captures images of the measurement apparatus 20a. In the example shown in FIG. 4, the load is applied from above the measurement target area of the measurement apparatus 20a. Therefore, the correction processing unit 13 corrects vibrations measured by the measurement apparatus 20a, using time-series images output from the imaging apparatus 30b.

In this way, in the example shown in FIG. 4, it is possible to accurately measure vibrations of the bridge, which is the object 40, for each position. Although only two measurement apparatuses, namely the measurement apparatuses 20a and 20b, are shown in the example in FIG. 4, the number of measurement apparatuses is not particularly limited in the present example embodiment. In the present example embodiment, the number of measurement apparatuses is appropriately set according to the size of the object. In such a case, the number of imaging apparatuses 30 is also appropriately set.

Figure 5:
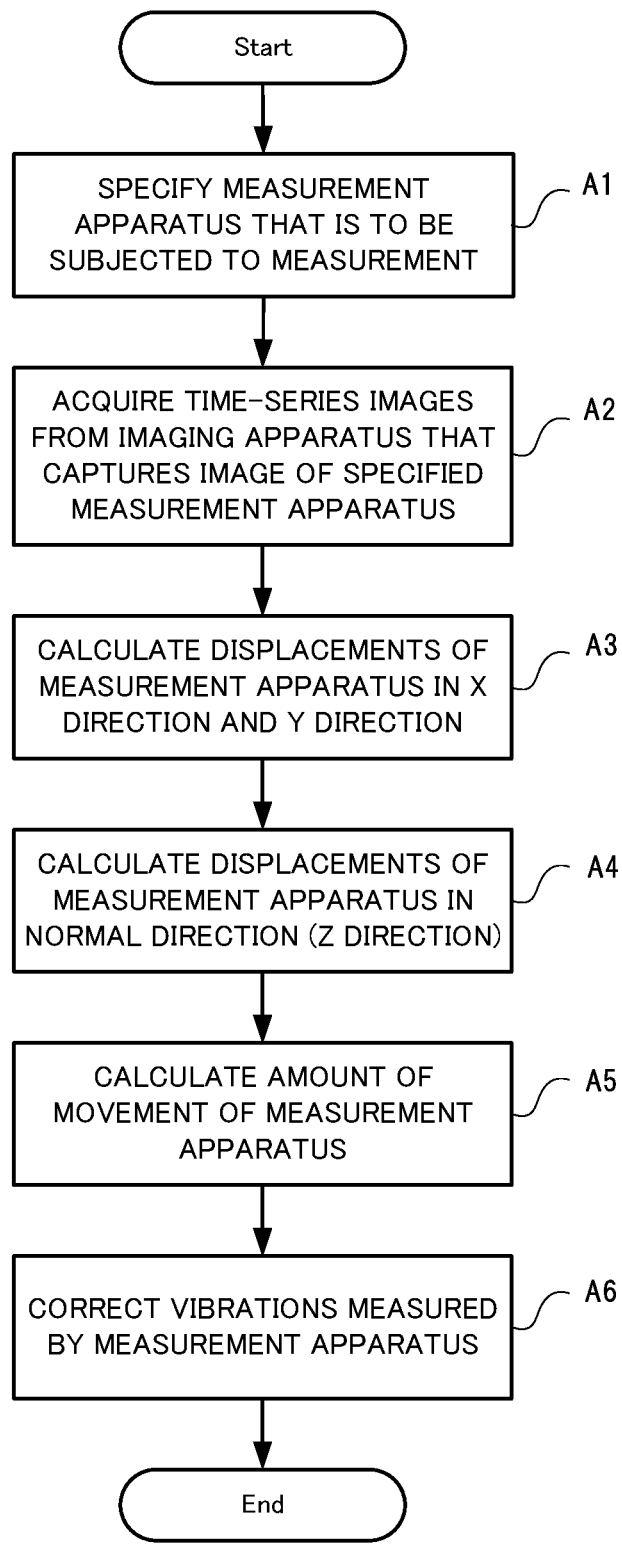
FIG. 5 is a flowchart showing operations of the correction processing apparatus according to the example embodiment of the invention.

Apparatus Operations Next, operations of the measurement system 100 and the correction processing apparatus 10 according to the example embodiment of the invention will be described with reference to FIG. 5. FIG. 5 is a flowchart showing operations of the correction processing apparatus according to the example embodiment of the invention. In the following description, FIG. 1 will be referenced as appropriate. Also, in the present example embodiment, a correction processing method is performed by operating the correction processing apparatus 10. Therefore, the following description of operations of the correction processing apparatus substitutes for a description of a correction processing method according to the present example embodiment.

As shown in FIG. 5, first, the correction processing unit 13 in the correction processing apparatus 10 specifies a position where the load of the bridge is applied, using the sensors installed on the bridge, which is the object 40, and specifies the measurement apparatus 20 that measures vibrations of a part that is closes to the specified position (step A1).

Next, the displacement calculation unit 11 specifies the imaging apparatus 30 that captures an image of the measurement apparatus 20 specified in step A1, and acquires the image data of time-series images output from the specified imaging apparatus (step A2). Specifically, the imaging apparatus 30 outputs pieces of image data at a preset frame rate, and therefore the displacement calculation unit 11 acquires the image data of time-series images until a predetermined period is reached or a predetermined number of frames is reached.

Next, the displacement calculation unit 11 determines one image captured at a given point in time, from among the acquired time-series images, as a reference image, determines the other images as processing images, and compares them with each other to calculate the displacement of the specific area in the horizontal direction (the X direction) of the images and the displacement of the specific area in the vertical direction (the Y direction) of the images (step A3). The displacements calculated at this time are the displacements of a measurement apparatus 20 relative to the imaging apparatus 30 that captures an image of the measurement apparatus 20, in directions corresponding to the horizontal direction and the vertical direction of the images.

Specifically, in step A2, as described above, the displacement calculation unit 11 compares the specific areas on the processing images and the reference image, and specifies the position of the area of the processing images that is the most similar to the specific area of the reference image. A method for finding the most similar specific area is, for example, a method utilizing a similarity correlation function such as the SAD (Sum of Absolute Difference), the SSD (Sum of Squared Difference), the NCC (Normalized Cross-Correlation), the ZNCC (Zero-means Normalized Cross-Correlation) to find the position (the coordinate point) with the highest correlation level.

Also, in order to improve the accuracy of calculation, the displacement calculation unit 11 may use a similarity correlation function regarding areas at front, rear, left, and right positions relative to the position of the specific area with the highest degree of similarity, and employ a method such as linear fitting, curve fitting, or parabolic fitting, as appropriate. The positions thus obtained are calculated as the displacements (d1x,d1y) of the imaging apparatus 20 relative to the imaging apparatus 30, corresponding to the horizontal direction and the vertical direction of the images.

Next, using the processing images, the reference image, and the displacements (d1x,d1y) of the measurement apparatus 20 calculated in step A3, the displacement calculation unit 11 calculates the magnification d1z indicating the displacement in the normal direction of the measurement target area (the Z direction) (step A4).

Specifically, in step A3, as described above, the displacement calculation unit 11 creates a set of reference images by enlarging or reducing the reference image at predetermined magnifications. Also, the displacement calculation unit 11 calculates the degree of similarity between the area corresponding to the specific area of the processing images and the specific area of each of the images constituting the set of reference images. At this time, the degree of similarity can be calculated by, for example, using any of the similarity correlation functions described above, such as the SAD, the SSD, the NCC, and the ZNCC.

Thereafter, the displacement calculation unit 11 specifies the image with the highest degree of similarity, i.e. the image with the highest correlation level, from among the images constituting the set of reference images, and calculates the magnification of the specified image as the magnification (d1z) indicating the displacement of the specific area in the normal direction.

Furthermore, as necessary, the displacement calculation unit 11 may calculate the similarity correlation functions of images before and after the image with the highest degree of similarity, in order of magnifications, and accurately calculate the magnification by using them and employing a method such as linear fitting, curve fitting, or the like. As a result of this processing, the magnification is calculated as the magnification (d1z) indicating the displacement of the specific area of the measurement apparatus 20 in the normal direction. Also, the processing in steps A3 and A4 may be repeatedly performed two or more times.

Next, the movement amount calculation unit 12 calculates the actual amount of movement of the measurement apparatus 20, using the displacements (d1x,d1y) in the horizontal direction and the vertical direction calculated in step A3, the magnification d1z calculated in step A4, and imaging information regarding the imaging apparatus 30 (step A5).

Specifically, the size of one pixel (the pitch per pixel) of the solid-state imaging sensor of the imaging apparatus 30 is denoted as d (mm), the focal distance of the lens is denoted as f (mm), the distance from the principal point of the lens to the measurement apparatus 20 is denoted as L (mm), and the shooting frame rate is denoted as FPS (fps). In this case, the size D (mm/pixel) of one pixel of a captured image is calculated according to Math. 1 shown below.

$$D = d \times (L/f) \qquad \text{Math. 1}$$

Here, it is assumed that the displacements calculated in step A3 are dnx (pixel) and dny (pixel), and the magnification calculated in step A4 is dnz (magnification). In this case, the movement amount calculation unit 12 calculates the actual amounts of movement (mm) of the measurement apparatus 20 relative to the imaging apparatus 30 according to Math. 2 to Math. 4 shown below. Here, the moving direction of the measurement apparatus 20 corresponding to the horizontal direction of the time-series images is referred to as an "in-plane horizontal direction", and the moving direction of the measurement apparatus 20 corresponding to the vertical direction of the time-series images is referred to as an "in-plane vertical direction".

The actual amount of movement (mm) of the measurement apparatus in the in-plane horizontal direction=$dnx \times D$  Math. 2

The actual amount of movement (mm) of the measurement apparatus in the in-plane vertical direction=$dny \times D$  Math. 3

The actual amount of movement (mm) of the measurement apparatus in the normal direction=$(1/dnz-1) \times L$  Math. 4

Also, when the amounts of movement are calculated for the displacements and the magnification calculated from the time-series images, data regarding the amounts of movement can be obtained at time intervals that are equal to the inverse of the shooting frame rate (1/FPS). Therefore, the data thus obtained can be regarded as vibration information obtained at sampling intervals that are equal to the inverse of the shooting frame rate.

Next, using the amounts of movement obtained in step A5, the correction processing unit 13 corrects vibrations specified by the vibration data acquired from the measurement apparatus 20, so as to be vibrations of the object 40 relative to the imaging apparatus 30 (step A6). Also, the correction processing unit 13 outputs data that specifies the corrected vibrations.

Specifically, the correction processing unit 13 acquires vibration data from the measurement apparatus 20, and specifies the amount of movement of the measurement target area relative to the measurement apparatus 30, from the acquired vibration data. Thereafter, the correction processing unit 13 calculates vibrations of the object 40 by subtracting the amount of movement of the measurement apparatus 20 calculated in step A5 from the specified amount of movement.

Effects of Example Embodiment

As described above, according to the present example embodiment, the value of vibrations measured by each measurement apparatus 20 is corrected so as to be a value relative to the imaging apparatus 30 that is not affected by vibrations. Therefore, even if the measurement apparatus 20 is installed in a location that is likely to be vibrated, it is possible to accurately measure vibrations of the object 40. Although vibrations are corrected in three directions in the present example embodiment, the present invention is not limited in this way, and vibrations may be corrected in only one direction.

First Modification

Figure 6:
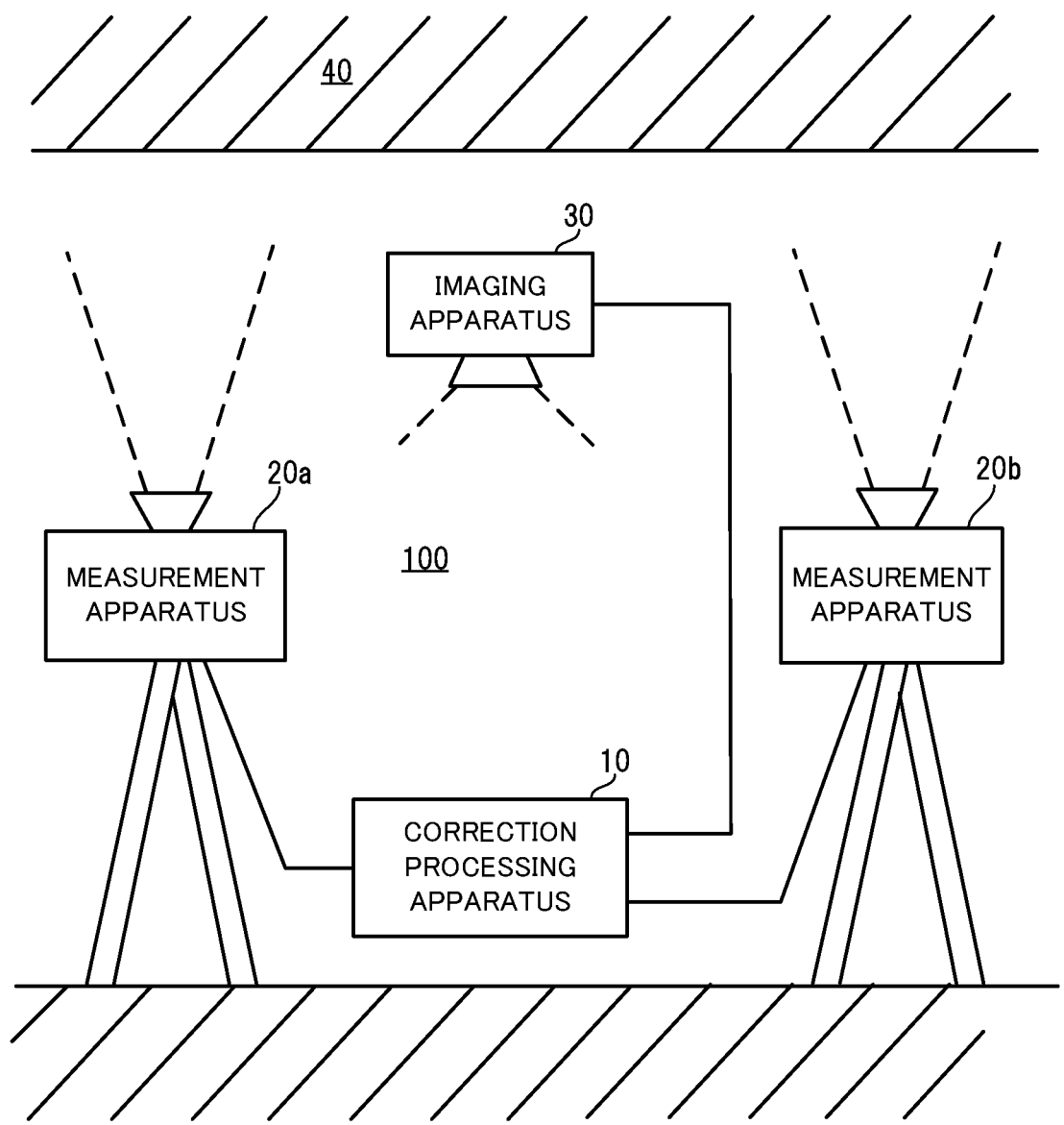
FIG. 6 is a configuration diagram showing a first modification of the measurement system according to the example embodiment of the invention.

Hereinafter, a first modification of the example embodiment will be described with reference to FIG. 6. FIG. 6 is a configuration diagram showing the first modification of the measurement system according to the example embodiment of the invention. Although one imaging apparatus 30 is used for each measurement apparatus 20 in the example shown in FIGS. 1 to 5, the example embodiment is not limited to such a mode, and images of a plurality of measurement apparatuses 20 may be captured by one imaging apparatus 30.

As shown in FIG. 6, in the first modification, images of the measurement apparatuses 20a and 20b are captured by one imaging apparatus 30. The imaging apparatus 30 may be provided with a wide-angle lens, and may be located so as to capture images of two measurement apparatuses at a time, or provided with a rotating table or the like that can change the shooting direction of the imaging apparatus 30, and configured to be able to alternatingly capture images of the two measurement apparatuses 20a and 20b. However, the imaging apparatus 30 need be installed in a location that is not affected by vibrations of the object 40.

It is possible to calculate the vibration amount of each measurement apparatus 20 itself based on time-series images from the imaging apparatus 30 in the first modification shown in FIG. 6 as well. Therefore, through correction, it is possible to cancel out the vibration amount of the measurement apparatus 20 itself from vibrations measured by the measurement apparatus 20. Therefore, it is also possible to accurately measure vibrations of the object 40 when each measurement apparatus 20 is installed in a location that is likely to be vibrated, by employing the first modification.

Second Modification

Figure 7:
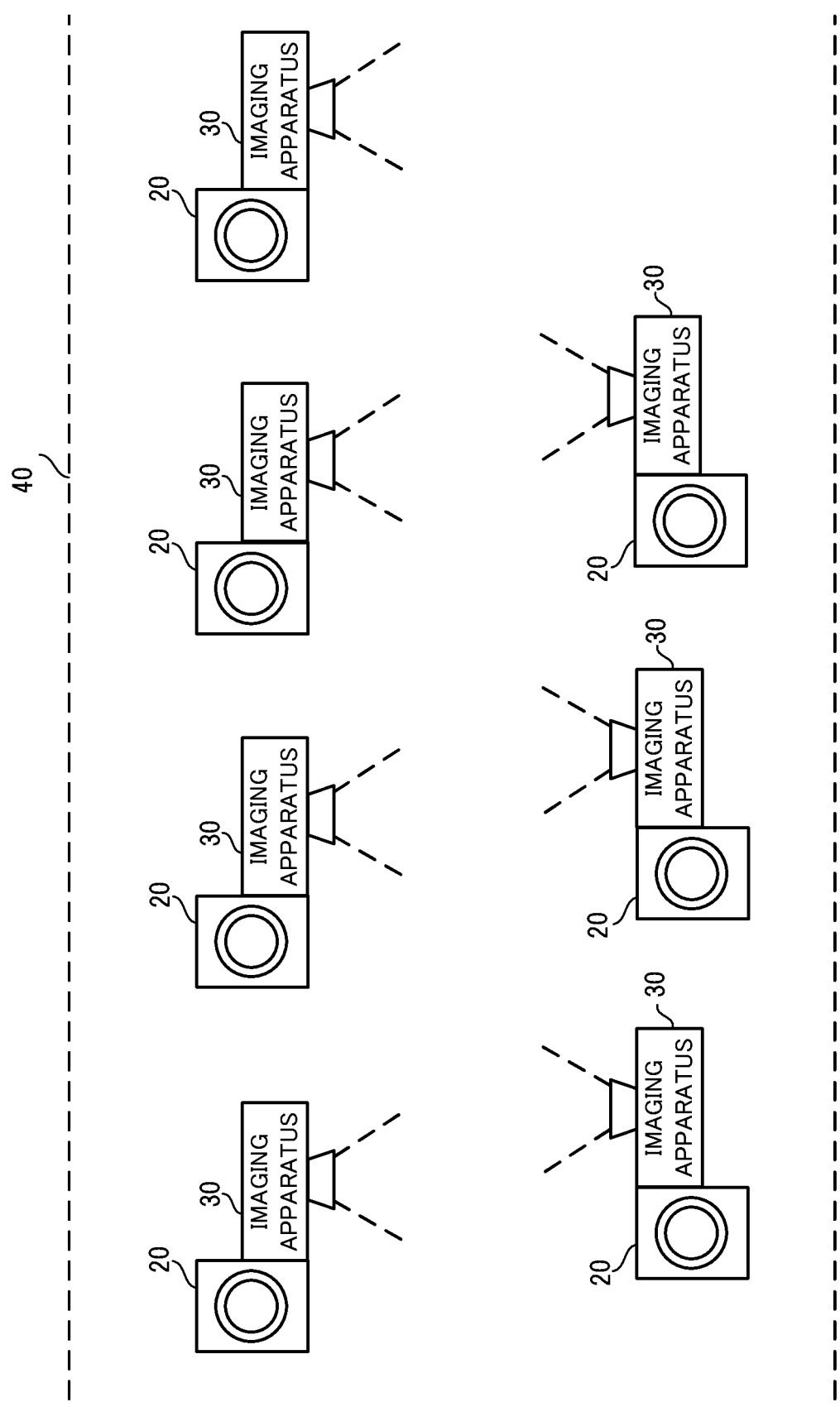
FIG. 7 is a configuration diagram showing a second modification of the measurement system according to the example embodiment of the invention.

Hereinafter, a second modification of the example embodiment will be described with reference to FIG. 7. FIG. 7 is a configuration diagram showing the second modification of the measurement system according to the example embodiment of the invention. Note that the measurement apparatuses 20 and the imaging apparatuses 30 in FIG. 7 are viewed from above, instead of from a side. Also, in FIG. 7, only the outline of the object 40 is indicated by dotted lines. In the second modification, one imaging apparatus 30 captures images of two measurement apparatuses as in the first modification.

As shown in FIG. 7, in the second modification, a plurality of measurement apparatuses 20 are arranged in two rows in the longitudinal direction of the bridge, which is the object 40, such that each measurement apparatus 20 in one row and two measurement apparatuses 20 in the other row are located at the vertices of the same equilateral triangle.

Also, each of the plurality of imaging apparatuses 30 is fixed to the measurement apparatus 20 corresponding thereto. Note that each imaging apparatus 30 is fixed to the measurement apparatus 20 corresponding thereto such that the imaging apparatus 30 captures images of two measurement apparatus 20 that are located in the row other than the row in which the measurement apparatus 20 corresponding thereto is located.

It is possible to calculate the vibration amount of each measurement apparatus 20 itself based on time-series images from the imaging apparatus 30 in the second modification shown in FIG. 7 as well. Therefore, through correction, it is possible to cancel out the vibration amount of the measurement apparatus 20 itself from vibrations measured by the measurement apparatus 20. Therefore, it is also possible to accurately measure vibrations of the object 40 when each measurement apparatus 20 is installed in a location that is likely to be vibrated, by employing the second modification.

Program

A program according to the example embodiment need only be a program that causes a computer to execute steps A1 to A6 shown in FIG. 5. The correction processing apparatus 10 and the correction processing method according to this example embodiment can be realized by installing this program to a computer and executing the program. In this case, a CPU (Central Processing Unit) of the computer functions as the displacement calculation unit 11, the movement amount calculation unit 12, and the correction processing unit 13, and performs processing.

The program according to the example embodiment may be executed by a computer system that is established from a plurality of computers. In this case, for example, each computer may function as one of the displacement calculation unit 11, the movement amount calculation unit 12, and the correction processing unit 13.

Figure 8:
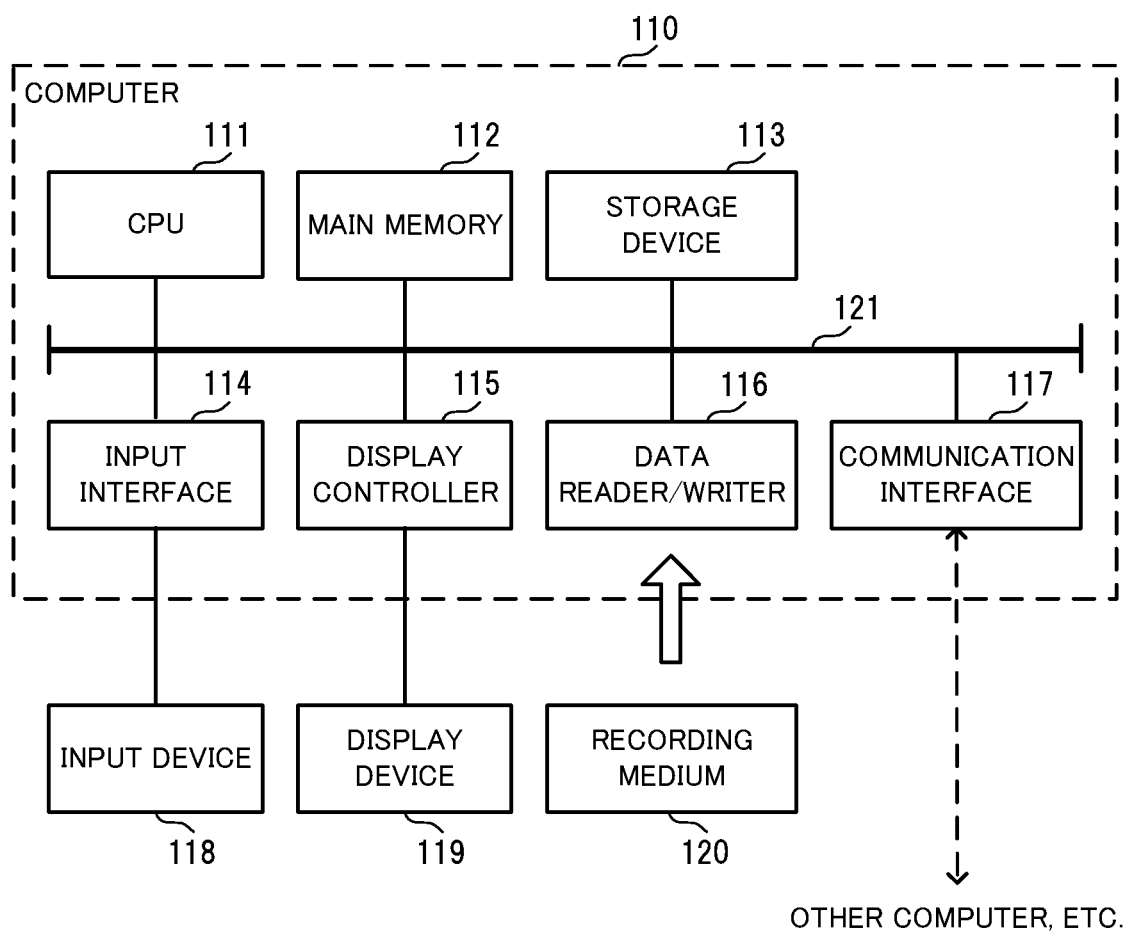
FIG. 8 is a block diagram showing an example of a computer that realizes the correction processing apparatuses according to the example embodiment of the invention.

Hereinafter, a computer that realizes the correction processing apparatus 10 by executing the program according to the example embodiment will be described with reference to FIG. 8. FIG. 8 is a block diagram showing an example of a computer that realizes the correction processing apparatuses according to the example embodiment of the invention.

As shown in FIG. 8, a computer 110 includes a CPU 111, a main memory 112, a storage device 113, an input interface 114, a display controller 115, a data reader/writer 116, and a communication interface 117. These units are connected to each other via a bus 121 so as to be able to perform data communication with each other.

The CPU 111 loads a program (codes) according to the example embodiments, stored in the storage device 113, onto the main memory 112, and executes the codes in a predetermined order to perform various calculations. The main memory 112 is typically a volatile storage device such as a DRAM (Dynamic Random Access Memory). The program according to the example embodiments is provided in a state of being stored in a computer-readable recording medium 120. Note that the program according to the example embodiments may be distributed over the Internet connected via the communication interface 117.

Specific examples of the storage device 113 include, in addition to a hard disk drive, a semiconductor storage device such as a flash memory. The input interface 114 mediates data transmission between the CPU 111 and an input device 118 such as a keyboard or a mouse. The display controller 115 is connected to a display device 119 and controls display by the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and another computer.

Specific examples of the recording medium 120 include a general-purpose semiconductor storage device such as a CF (Compact Flash (registered trademark)) or an SD (Secure Digital) card, a magnetic storage medium such as a flexible disk, and an optical storage medium such as a CD-ROM (Compact Disk Read Only Memory).

Note that the correction processing apparatus 10 according to the example embodiment can also be realizable by using hardware corresponding to the respective units, rather than by a computer on which the program is installed. Furthermore, the correction processing apparatus 10 may respectively be realized in part by a program, and the remaining portion may be realized by hardware.

The example embodiment described above can be partially or wholly realized by supplementary notes 1 to 13 described below, but the invention is not limited to the following description.

Supplementary Note 1

A measurement system comprising: a measurement apparatus that measures vibrations of an object; an imaging apparatus that is disposed so as to capture an image of the measurement apparatus; and a correction processing apparatus, the correction processing apparatus comprising:

a displacement calculation unit that calculates a displacement of the measurement apparatus from time-series images of the measurement apparatus output from the imaging apparatus;

a movement amount calculation unit that calculates an amount of movement of the measurement apparatus relative to the imaging apparatus, based on the displacement; and a correction processing unit that corrects vibrations of the object measured by the measurement apparatus, using the calculated amount of movement of the measurement apparatus.

Supplementary Note 2

The measurement system according to Supplementary Note 1, wherein the measurement apparatus and the imaging apparatus are each provided in plurality, each of the plurality of imaging apparatuses corresponds to one of the measurement apparatuses, and is fixed to the one of the measurement apparatuses corresponding thereto so as to capture an image of another measurement apparatus of the measurement apparatuses, the plurality of measurement apparatuses are arranged at intervals and each measure vibrations of a different part of the object, and in the correction processing apparatus:

the displacement calculation unit calculates, for each of the plurality of imaging apparatuses, a displacement of a measurement apparatus whose image is captured by the imaging apparatus, based on time-series images of the measurement apparatus captured by the imaging apparatus, the movement amount calculation unit calculates, for each of the plurality of measurement apparatuses, an amount of movement of the measurement apparatus relative to the imaging apparatus that captures an image of the measurement apparatus, based on the displacement of the measurement apparatus, and the correction processing unit corrects, for each of the plurality of measurement apparatuses, vibrations of the object measured by the measurement apparatus, using the calculated amount of movement of the measurement apparatus.

Supplementary Note 3

The measurement system according to Supplementary Note 2, wherein the object is a bridge, the plurality of measurement apparatuses are arranged at intervals in a longitudinal direction of the bridge, and each measure vibrations of a different part of a lower surface of a slab of the bridge, and in the correction processing apparatus, the correction processing unit specifies the measurement apparatus that measures vibrations of a part that is the closest to a portion of the bridge where a load is applied, and corrects vibrations of the specified measurement apparatus.

Supplementary Note 4

The measurement system according to Supplementary Note 3, wherein the plurality of measurement apparatuses are arranged in two rows in the longitudinal direction of the bridge such that each measurement apparatus in one row and two measurement apparatuses in the other row are located at vertices of the same equilateral triangle, and each of the plurality of imaging apparatuses is fixed to the measurement apparatus corresponding thereto such that the imaging apparatus captures images of two measurement apparatus that are located in the row other than the row in which the measurement apparatus corresponding thereto is located.

Supplementary Note 5

A correction processing apparatus for correcting vibrations measured by a measurement apparatus that measures vibrations of an object, the correction processing apparatus comprising:

a displacement calculation unit that calculates a displacement of the measurement apparatus from time-series images of the measurement apparatus output from an imaging apparatus that is located so as to capture an image of the measurement apparatus;

a movement amount calculation unit that calculates an amount of movement of the measurement apparatus relative to the imaging apparatus, based on the displacement; and a correction processing unit that corrects vibrations of the object measured by the measurement apparatus, using the calculated amount of movement of the measurement apparatus.

Supplementary Note 6

The correction processing apparatus according to Supplementary Note 5, wherein the measurement apparatus and the imaging apparatus are each provided in plurality, each of the plurality of imaging apparatuses corresponds to one of the measurement apparatuses, and is fixed to the one of the measurement apparatuses corresponding thereto so as to capture an image of another measurement apparatus of the measurement apparatuses, when the plurality of measurement apparatuses are arranged at intervals and each measure vibrations of a different part of the object, the displacement calculation unit calculates, for each of the plurality of imaging apparatuses, a displacement of a measurement apparatus whose image is captured by the imaging apparatus, based on time-series images of the measurement apparatus captured by the imaging apparatus, the movement amount calculation unit calculates, for each of the plurality of measurement apparatuses, an amount of movement of the measurement apparatus relative to the imaging apparatus that captures an image of the measurement apparatus, based on the displacement of the measurement apparatus, and the correction processing unit corrects, for each of the plurality of measurement apparatuses, vibrations of the object measured by the measurement apparatus, using the calculated amount of movement of the measurement apparatus.

Supplementary Note 7

The correction processing apparatus according to Supplementary Note 6, wherein the object is a bridge, when the plurality of measurement apparatuses are arranged at intervals in a longitudinal direction of the bridge, and each measure vibrations of a different part of a lower surface of a slab of the bridge, the correction processing unit specifies the measurement apparatus that measures vibrations of a part that is the closest to a portion of the bridge where a load is applied, and corrects vibrations measured by the specified measurement apparatus.

Supplementary Note 8

A method for correcting vibrations measured by a measurement apparatus that measures vibrations of an object, the method comprising:

(a) a step of calculating a displacement of the measurement apparatus from time-series images of the measurement apparatus output from an imaging apparatus that is located so as to capture an image of the measurement apparatus;

(b) a step of calculating an amount of movement of the measurement apparatus relative to the imaging apparatus, based on the displacement; and (c) a step of correcting vibrations of the object measured by the measurement apparatus, using the calculated amount of movement of the measurement apparatus.

Supplementary Note 9

The correction processing method according to Supplementary Note 8, wherein the measurement apparatus and the imaging apparatus are each provided in plurality, each of the plurality of imaging apparatuses corresponds to one of the measurement apparatuses, and is fixed to the one of the measurement apparatuses corresponding thereto so as to capture an image of another measurement apparatus of the measurement apparatuses, when the plurality of measurement apparatuses are arranged at intervals and each measure vibrations of a different part of the object, in the (a) step, for each of the plurality of imaging apparatuses, a displacement of a measurement apparatus whose image is captured by the imaging apparatus is calculated based on time-series images of the measurement apparatus captured by the imaging apparatus, in the (b) step, for each of the plurality of measurement apparatuses, an amount of movement of the measurement apparatus relative to the imaging apparatus that captures an image of the measurement apparatus is calculated based on the displacement of the measurement apparatus, and in the (c) step, for each of the plurality of measurement apparatuses, vibrations of the object measured by the measurement apparatus are corrected, using the calculated amount of movement of the measurement apparatus.

Supplementary Note 10

The correction processing method according to Supplementary Note 9, wherein the object is a bridge, when the plurality of measurement apparatuses are arranged at intervals in a longitudinal direction of the bridge, and each measure vibrations of a different part of a lower surface of a slab of the bridge, in the (c) step, the measurement apparatus that measures vibrations of a part that is the closest to a portion of the bridge where a load is applied is specified, and vibrations measured by the specified measurement apparatus are corrected.

Supplementary Note 11

A computer-readable recording medium having recorded thereon a program for correcting vibrations measured by a measurement apparatus that measures vibrations of an object, using a computer, the program including instructions that cause the computer to carry out:

(a) a step of calculating a displacement of the measurement apparatus from time-series images of the measurement apparatus output from an imaging apparatus that is located so as to capture an image of the measurement apparatus;

(b) a step of calculating an amount of movement of the measurement apparatus relative to the imaging apparatus, based on the displacement; and (c) a step of correcting vibrations of the object measured by the measurement apparatus, using the calculated amount of movement of the measurement apparatus.

Supplementary Note 12

The computer-readable recording medium according to Supplementary Note 11, wherein the measurement apparatus and the imaging apparatus are each provided in plurality, each of the plurality of imaging apparatuses corresponds to one of the measurement apparatuses, and is fixed to the one of the measurement apparatuses corresponding thereto so as to capture an image of another measurement apparatus of the measurement apparatuses, when the plurality of measurement apparatuses are arranged at intervals and each measure vibrations of a different part of the object, in the (a) step, for each of the plurality of imaging apparatuses, a displacement of a measurement apparatus whose image is captured by the imaging apparatus is calculated based on time-series images of the measurement apparatus captured by the imaging apparatus, in the (b) step, for each of the plurality of measurement apparatuses, an amount of movement of the measurement apparatus relative to the imaging apparatus that captures an image of the measurement apparatus is calculated based on the displacement of the measurement apparatus, and in the (c) step, for each of the plurality of measurement apparatuses, vibrations of the object measured by the measurement apparatus are corrected, using the calculated amount of movement of the measurement apparatus.

Supplementary Note 13

The computer-readable recording medium according to Supplementary Note 12, wherein the object is a bridge, when the plurality of measurement apparatuses are arranged at intervals in a longitudinal direction of the bridge, and each measure vibrations of a different part of a lower surface of a slab of the bridge, in the (c) step, the measurement apparatus that measures vibrations of a part that is the closest to a portion of the bridge where a load is applied is specified, and vibrations measured by the specified measurement apparatus are corrected.

Although the present invention has been described above with reference to the example embodiment, the invention is not limited to the example embodiment described above. Various modifications apparent to those skilled in the art can be made to the configurations and details of the invention within the scope of the invention.

INDUSTRIAL APPLICABILITY

As described above, according to the invention, it is possible to accurately measure vibrations of an object even if the measurement apparatus that measures vibrations of the object is installed in a location that is likely to be vibrated. The invention is useful in the field of maintenance and management, and abnormality detection, of infrastructural components such as bridges, roads, buildings, and facilities.

LIST OF REFERENCE SIGNS

10: Correction Processing Apparatus
11: Displacement Calculation Unit
12: Movement Amount Calculation Unit
13: Correction Processing Unit
20, 20a, 20b: Measurement Apparatus
30, 30a, 30b: Imaging Apparatus
40: Object
100: Measurement System
110: Computer
111: CPU
112: Main Memory
113: Storage Device
114: Input Interface
115: Display Controller
116: Data Reader/Writer
117: Communication Interface
118: Input Device
119: Display Device
120: Recording Medium
121: Bus

What is claimed is:

1. A measurement system comprising: a measurement apparatus that measures vibrations of an object; an imaging apparatus that is disposed so as to capture an image of the measurement apparatus; and a correction processing apparatus, the correction processing apparatus comprising:

a processor; and a memory storing executable instructions that, when executed by the processor, causes the processor to perform as:

a displacement calculation unit that calculates a displacement of the measurement apparatus based on time-series images of the measurement apparatus output from the imaging apparatus;

a movement amount calculation unit that calculates an amount of movement of the measurement apparatus relative to the imaging apparatus, based on the displacement; and a correction processing unit that corrects vibrations of the object measured by the measurement apparatus, using the calculated amount of movement of the measurement apparatus, wherein the measurement apparatus and the imaging apparatus are each provided in plurality, each of the plurality of imaging apparatuses corresponds to one of the measurement apparatuses, and is fixed to the one of the measurement apparatuses corresponding thereto so as to capture an image of another measurement apparatus of the measurement apparatuses, the plurality of measurement apparatuses are arranged at intervals and each measure vibrations of a different part of the object, in the correction processing apparatus, the displacement calculation unit calculates, for each of the plurality of imaging apparatuses, a displacement of a measurement apparatus whose image is captured by the imaging apparatus, based on time-series images of the measurement apparatus captured by the imaging apparatus, the movement amount calculation unit calculates, for each of the plurality of measurement apparatuses, an amount of movement of the measurement apparatus relative to the imaging apparatus that captures an image of the measurement apparatus, based on the displacement of the measurement apparatus, and the correction processing unit corrects, for each of the plurality of measurement apparatuses, vibrations of the object measured by the measurement apparatus, using the calculated amount of movement of the measurement apparatus.

2. The measurement system according to claim 1, wherein the object is a bridge, the plurality of measurement apparatuses are arranged at intervals in a longitudinal direction of the bridge, and each measure vibrations of a different part of a lower surface of a slab of the bridge, and in the correction processing apparatus, the correction processing unit specifies the measurement apparatus that measures vibrations of a part that is the closest to a portion of the bridge where a load is applied, and corrects vibrations measured by the specified measurement apparatus.

3. The measurement system according to claim 2, wherein the plurality of measurement apparatuses are arranged in two rows in the longitudinal direction of the bridge such that each measurement apparatus in one row and two measurement apparatuses in the other row are located at vertices of the same equilateral triangle, and each of the plurality of imaging apparatuses is fixed to the measurement apparatus corresponding thereto such that the imaging apparatus captures images of two measurement apparatus that are located in the row other than the row in which the measurement apparatus corresponding thereto is located.

4. A correction processing apparatus for correcting vibrations measured by a measurement apparatus that measures vibrations of an object, the correction processing apparatus comprising:

a processor; and a memory storing executable instructions that, when executed by the processor, causes the processor to perform as:

a displacement calculation unit that calculates a displacement of the measurement apparatus based on time-series images of the measurement apparatus output from an imaging apparatus that is located so as to capture an image of the measurement apparatus;

a movement amount calculation unit that calculates an amount of movement of the measurement apparatus relative to the imaging apparatus, based on the displacement; and a correction processing unit that corrects vibrations of the object measured by the measurement apparatus, using the calculated amount of movement of the measurement apparatus, wherein the measurement apparatus and the imaging apparatus are each provided in plurality, each of the plurality of imaging apparatuses corresponds to one of the measurement apparatuses, and is fixed to the one of the measurement apparatuses corresponding thereto so as to capture an image of another measurement apparatus of the measurement apparatuses, when the plurality of measurement apparatuses are arranged at intervals and each measure vibrations of a different part of the object, the displacement calculation unit calculates, for each of the plurality of imaging apparatuses, a displacement of a measurement apparatus whose image is captured by the imaging apparatus, based on time-series images of the measurement apparatus captured by the imaging apparatus, the movement amount calculation unit calculates, for each of the plurality of measurement apparatuses, an amount of movement of the measurement apparatus relative to the imaging apparatus that captures an image of the measurement apparatus, based on the displacement of the measurement apparatus, and the correction processing unit corrects, for each of the plurality of measurement apparatuses, vibrations of the object measured by the measurement apparatus, using the calculated amount of movement of the measurement apparatus.

5. The correction processing apparatus according to claim 4, wherein the object is a bridge, when the plurality of measurement apparatuses are arranged at intervals in a longitudinal direction of the bridge, and each measure vibrations of a different part of a lower surface of a slab of the bridge, the correction processing unit specifies the measurement apparatus that measures vibrations of a part that is the closest to a portion of the bridge where a load is applied, and corrects vibrations measured by the specified measurement apparatus.

6. A correction processing method for correcting vibrations measured by a measurement apparatus that measures vibrations of an object, the correction processing method comprising:

calculating a displacement of the measurement apparatus based on time-series images of the measurement apparatus output from an imaging apparatus that is located so as to capture an image of the measurement apparatus;

calculating an amount of movement of the measurement apparatus relative to the imaging apparatus, based on the displacement; and correcting vibrations of the object measured by the measurement apparatus, using the calculated amount of movement of the measurement apparatus, wherein the measurement apparatus and the imaging apparatus are each provided in plurality, each of the plurality of imaging apparatuses corresponds to one of the measurement apparatuses, and is fixed to the one of the measurement apparatuses corresponding thereto so as to capture an image of another measurement apparatus of the measurement apparatuses, when the plurality of measurement apparatuses are arranged at intervals and each measure vibrations of a different part of the object, for each of the plurality of imaging apparatuses, a displacement of a measurement apparatus whose image is captured by the imaging apparatus is calculated based on time-series images of the measurement apparatus captured by the imaging apparatus, for each of the plurality of measurement apparatuses, an amount of movement of the measurement apparatus relative to the imaging apparatus that captures an image of the measurement apparatus is calculated based on the displacement of the measurement apparatus, and for each of the plurality of measurement apparatuses, vibrations of the object measured by the measurement apparatus are corrected, using the calculated amount of movement of the measurement apparatus.

7. The correction processing method according to claim 6, wherein the object is a bridge, when the plurality of measurement apparatuses are arranged at intervals in a longitudinal direction of the bridge, and each measure vibrations of a different part of a lower surface of a slab of the bridge, the measurement apparatus that measures vibrations of a part that is the closest to a portion of the bridge where a load is applied is specified, and vibrations measured by the specified measurement apparatus are corrected.

8. A non-transitory computer-readable recording medium having recorded thereon a program for correcting vibrations measured by a measurement apparatus that measures vibrations of an object, using a computer, the program including instructions that cause the computer to carry out:

calculating a displacement of the measurement apparatus from time-series images of the measurement apparatus output from an imaging apparatus that is located so as to capture an image of the measurement apparatus;

calculating an amount of movement of the measurement apparatus relative to the imaging apparatus, based on the displacement; and correcting vibrations of the object measured by the measurement apparatus, using the calculated amount of movement of the measurement apparatus, wherein the measurement apparatus and the imaging apparatus are each provided in plurality, each of the plurality of imaging apparatuses corresponds to one of the measurement apparatuses, and is fixed to the one of the measurement apparatuses corresponding thereto so as to capture an image of another measurement apparatus of the measurement apparatuses, when the plurality of measurement apparatuses are arranged at intervals and each measure vibrations of a different part of the object, for each of the plurality of imaging apparatuses, a displacement of a measurement apparatus whose image is captured by the imaging apparatus is calculated based on time-series images of the measurement apparatus captured by the imaging apparatus, for each of the plurality of measurement apparatuses, an amount of movement of the measurement apparatus relative to the imaging apparatus that captures an image of the measurement apparatus is calculated based on the displacement of the measurement apparatus, and for each of the plurality of measurement apparatuses, vibrations of the object measured by the measurement apparatus are corrected, using the calculated amount of movement of the measurement apparatus.

9. The non-transitory computer-readable recording medium according to claim 8, wherein the object is a bridge, when the plurality of measurement apparatuses are arranged at intervals in a longitudinal direction of the bridge, and each measure vibrations of a different part of a lower surface of a slab of the bridge, the measurement apparatus that measures vibrations of a part that is the closest to a portion of the bridge where a load is applied is specified, and vibrations measured by the specified measurement apparatus are corrected.

* * * * *